United States Patent [19]
Porter et al.

[11] 3,866,224
[45] Feb. 11, 1975

[54] FREQUENCY DIVERSITY RADAR SYSTEM

[75] Inventors: William T. Porter, Newfield; John D. Pfeiffer, Norwich, both of N.Y.

[73] Assignee: The United States of America as represented by the Secretary of the Air Force, Washington, D.C.

[22] Filed: Oct. 13, 1958

[21] Appl. No.: 767,067

[52] U.S. Cl. ...... 343/17.2 R, 343/17.1 R, 343/18 E
[51] Int. Cl. ........ G01s 7/28, G01s 7/36, G01s 9/02
[58] Field of Search.......... 343/5 AFC, 12, 14, 17.5, 343/17.1, 17.2, 18, 17.1 R, 17.2 R, 18 E

[56] References Cited
UNITED STATES PATENTS

| | | | |
|---|---|---|---|
| 21,955 | 11/1941 | Chaffee................................ | 343/14 |
| 2,522,367 | 9/1950 | Guanella............................. | 343/17.1 |
| 2,603,744 | 7/1952 | Larson................................ | 343/17.1 |
| 2,695,995 | 11/1954 | Cauchois ............................ | 343/14 |
| 2,827,627 | 3/1958 | Arams............................ | 343/5 AFC |
| 2,856,600 | 10/1958 | Clevenger...................... | 343/5 AFC |

*Primary Examiner*—Malcolm F. Hubler
*Attorney, Agent, or Firm*—Harry A. Herbert, Jr.; Richard J. Killoran

EXEMPLARY CLAIM

1. An anti-jamming radar system, comprising: a voltage tunable magnetron, means for controlling the output frequency of said voltage tunable magnetron, a low frequency oscillator, means for modulating said voltage tunable magnetron output with the output frequency of said oscillator, said last-named means including means for suppressing the voltage tunable magnetron frequency, means for pulsing said modulating means to add pulse information to the output signal of said modulating means, a travelling wave tube amplifier, means for passing only the first lower sideband of the modulated signal to said amplifier, means for transmitting said amplified signal toward a target and for receiving the return signal from the target, a mixer circuit, means for applying the return signal to said mixer circuit, said last-named means including means for filtering out all frequencies in the image frequency band, means for applying the output of said voltage tunable magnetron to said mixer to thereby produce an intermediate frequency of the same frequency as said oscillator frequency, a display device, means for recovering the pulse information from said return signal and means for applying the pulse information to said display device.

3 Claims, 3 Drawing Figures

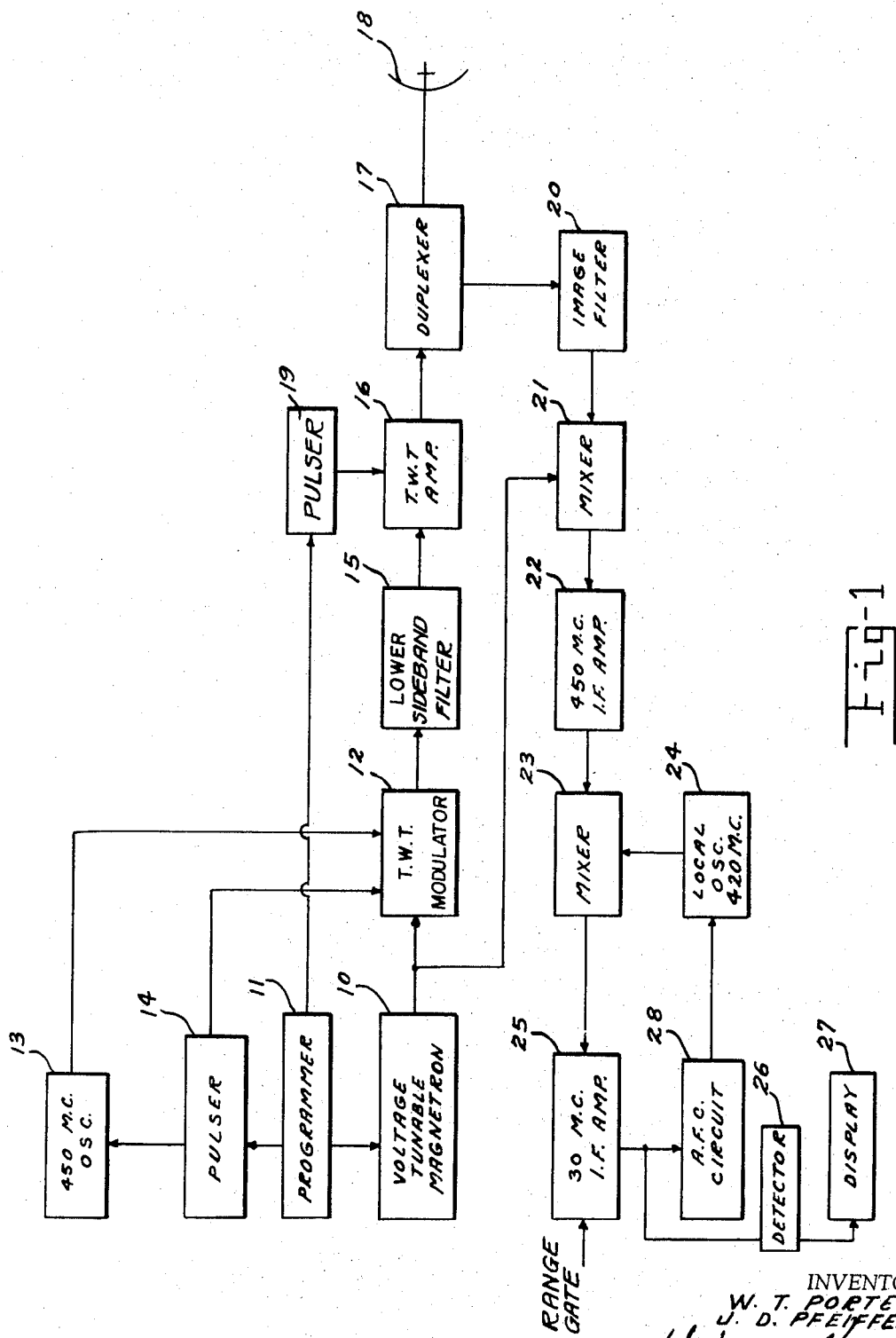

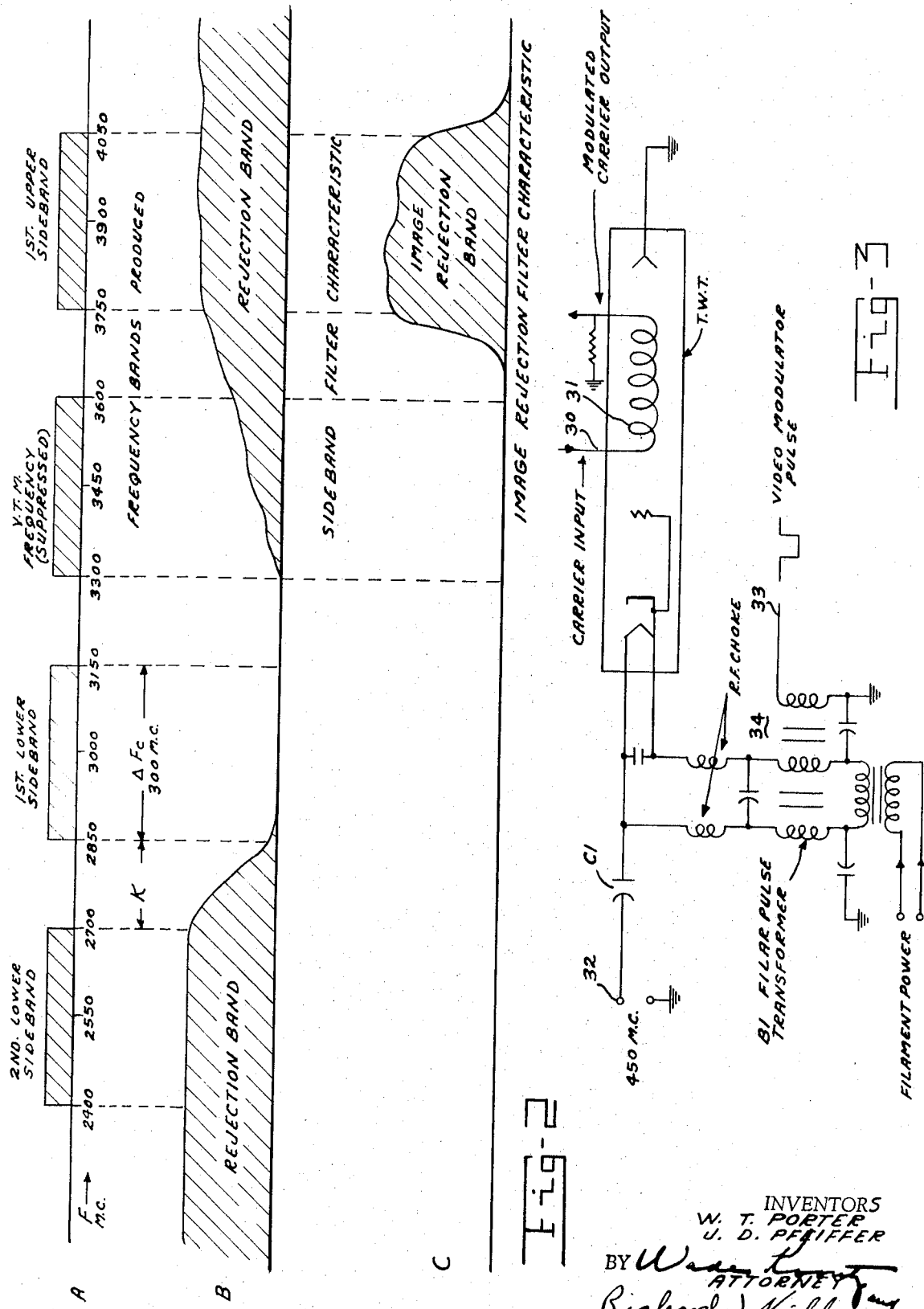

FREQUENCY DIVERSITY RADAR SYSTEM

RIGHTS OF THE GOVERNMENT

The invention described herein may be manufactured and used by or for the Government of the United States for all governmental purposes without the payment of any royalty.

This invention relates to a radar system in which the frequency of the transmitted pulse is changed from pulse to pulse.

One object of the invention is to provide a radar system which eliminates the receiver local oscillator tracking problem.

A further object is to provide a radar system which has a negligible amount of power lost in unused sidebands.

These and other objects will be more fully understood from the following detailed description taken with the drawing wherein:

FIG. 1 is a block diagram of a radar system according to the invention.

FIG. 2 shows the rejection characteristic for the sideband filter and the image frequency rejection filter used in the device of FIG. 1.

FIG. 3 shows one embodiment of a travelling wave tube modulator which may be used in the device of FIG. 1.

The basic problem is to develop a radar system which has a high degree of anti-jam ability. A system which changes its transmitted frequency from pulse to pulse has desirable anti-jamming characteristics. The two main problems in producing such a system are in providing for the automatic tracking of the receiver local oscillator and in filtering out unwanted frequencies generated in the system which consume transmitted power or cause the receiver to be jammed. According to this invention, a carrier wave signal $f_0$ is produced in a voltage tunable magnetron in which the frequency can be changed by changing its anode to cathode voltage. The output of the voltage tunable magnetron is applied to travelling wave tube which is phase modulated by another signal with a frequency which is the same as the IF of the receiver. By properly adjusting the travelling wave tube and the amplitudes of the two signals, the carrier wave frequency can be suppressed leaving only the sidebands displaced from the carrier wave frequency by $\pm N$ times the modulating frequency. For a discussion of the suppression of the carrier wave frequency in phase modulated travelling wave amplifiers, see "The Travelling Wave Tube as a Microwave Phase Modulator and Frequency Shifter" by W. T. Bray, Pgs. 15-20, Vol. 99, IEE Proceedings, Part III, 1952.

The output of the travelling wave tube modulator is fed to a suitable sideband filter wherein all sidebands except the first lower sideband is filtered out. The single sideband is then amplified and transmitted.

The carrier wave frequency from the voltage tunable magnetron is also used as the receiver local oscillator signal. The voltage tunable magnetron remains at one frequency until the transmitted pulse is received so that the proper intermediate frequency will be produced. The received echo signal from the target is passed through an image filter which filters out the image frequency $f_0 + 450$ mc. The received signal is then mixed with the signal from the voltage tunable magnetron to produce the IF signal. This IF signal will be of the same frequency as the signal which is used to phase modulate the travelling wave tube. The IF signal is then amplified, reconverted if necessary, detected and presented on a suitable display device.

Referring more particularly to FIG. 1 of the drawing, reference numeral 10 refers to a voltage tunable magnetron, the output frequency of which is a function of its anode to cathode voltage. This voltage is derived from a programmer 11, which can be made to change its output voltage either in a stairstep manner or in random steps. Random stepping may be desirable to keep the enemy jammer from predicting the next frequency to be used. The programmer is made to change the center transmitter frequency by approximately 10 percent. The output of the voltage tunable magnetron is applied to travelling wave tube modulator 12, which is phase modulated by a signal from an oscillator 13. When a 450 mc oscillator is used the phase modulation produces sidebands displaced from the voltage tunable magnetron frequency by $\pm N$ times 450 mc, where N is an integer. After each step of the programmer is initiated a short time is allowed to elapse to allow any transients to die out. Then a pulse from pulser 14 pulses on the travelling wave tube modulator 12 and also the oscillator 13. This pulse may last from $0.1\mu$ sec. to $10\mu$ sec. depending on the particular system. During the pulse the sidebands are produced in the travelling wave tube modulator 12 and the voltage tunable magnetron frequency is suppressed in the manner described in the IEE article referred to above. Modulator 12 will be explained in more detail with reference to FIG. 3. The output of travelling wave tube 12 is applied to the upper and lower sideband rejection filters 15. The lower sideband filter may be a wave guide below cutoff type filter. Filters 15 remove all but the first lower sideband and have a rejection characteristic as shown in FIG. 2, B.

From FIG. 2, it is seen that the slope of the rejection characteristics is rather steep at the lower end of the pass band. This steepness is necessary in order to provide sufficient attenuation within the frequency interval K. If the first upper sideband were transmitted instead of the first lower sideband, the requirement for a steep rejection characteristic would appear at the high end of the pass band and a simple wave guide below cutoff type filter could not be used. The upper sideband filter can be a simple filter and presents no particular design problem. The output of sideband filters 15 is passed through a travelling wave tube amplifier 16, duplexer 17, and radiated by means of an antenna element 18. Should sidebands other than the first lower sideband be allowed to enter the travelling wave amplifier 16 they would consume some of the power that this tube is capable of providing and this would subtract power from the first lower sideband RF pulse which determines the signal to noise ratio in the receiver. Also to save power travelling wave tube amplifier 16 is pulsed by pulser 19 at the same time that oscillator 13 is pulsed by pulser 14. Since the voltage tunable magnetron frequency is suppressed in the travelling wave tube modulator 12 only the first lower sideband is transmitted.

The transmitted lower sideband energy is received from the target by the antenna 18 and is fed to the receiving channel through duplexer 17. An image filter 20 prevents the receiver from being jammed by a jammer operating in the image frequency band. This filter has a rejection band as shown in FIG. 2, C. The received energy is applied to a mixer 21 where it is mixed with the voltage tunable magnetron frequency to produce the 450 mc difference frequency signal thereby making the use of a local oscillator together with its tracking problem unnecessary. The difference frequency is amplified in a 450 mc IF amplifier 22. This signal can then be reconverted to a 30 mc signal by the action of a second mixer 23 and a 420 mc local oscillator 24. The output of mixer 23 is fed to a 30 mc IF amplifier 25 and then to a detector 26 and a display device 27. The frequency of local oscillator 24 is held constant by means of an automatic frequency control circuit 28. The reason for the double conversion is that most of the IF amplification can be obtained by the use of more standard tubes and circuits though it is possible to obtain all the IF amplification at 450 mc. The double conversion system is included herein to make the system a little more general.

Referring now to FIG. 3 which shows one type of travelling wave tube modulator which may be used, the voltage tunable magnetron frequency is applied to the input 30 of the slow wave structure 31. The 450 mc phase modulating signal is applied at leads 32 directly to the gun structure through a capacitor C-1 to vary the speed of the electron stream as it enters the slow wave structure. Capacitor C-1 functions as a DC isolator for the 450 mc source. A pair of RF chokes are provided which have a high enough impedance at 450 mc to prevent loading down of the 450 mc source by the capacitance of the leads and DC and filament power supplies. The video pulse from pulse modulator 14 is applied at terminal 33 to the cathode by means of a bi-filar pulse transformer 34. For a more complete description of phase modulation and suppression of the carrier wave frequency in travelling wave tube type modulators see the IEE article referred to above.

While the invention has been described with respect to a voltage tunable magnetron, it is obvious that other rapidly tunable devices such as backward wave oscillators could be used. It is also obvious that any device which can produce phase modulation or frequency modulation in which the carrier can be suppressed can be used for the modulating device. Furthermore, the invention need not be limited to the use of travelling wave tube amplifiers since any broad band amplifier in the correct band of frequencies would be suitable.

There is thus provided a radar system which changes the transmitted frequency from pulse to pulse, which eliminates the receiver local oscillator tracking problem and which has a negligible amount of power lost in unused sidebands.

Though one specific embodiment has been described in some detail, it is obvious that numerous changes may be made without departing from the general principles and scope of the invention.

We claim:

1. An anti-jamming radar system, comprising; a voltage tunable magnetron, means for controlling the output frequency of said voltage tunable magnetron, a low frequency oscillator, means for modulating said voltage tunable magnetron output with the output frequency of said oscillator, said last-named means including means for suppressing the voltage tunable magnetron frequency, means for pulsing said modulating means to add pulse information to the output signal of said modulating means, a travelling wave tube amplifier, means for passing only the first lower sideband of the modulated signal to said amplifier, means for transmitting said amplified signal toward a target and for receiving the return signal from the target, a mixer circuit, means for applying the return signal to said mixer circuit, said last-named means including means for filtering out all frequencies in the image frequency band, means for applying the output of said voltage tunable magnetron to said mixer to thereby produce an intermediate frequency of the same frequency as said oscillator frequency, a display device, means for recovering the pulse information from said return signal and means for applying the pulse information to said display device.

2. An anti-jamming radar system, comprising; a voltage tunable magnetron, means for controlling the output frequency of said voltage tunable magnetron, a low frequency oscillator, means for modulating said voltage tunable magnetron output with the output frequency of said oscillator, said last-named means including means for suppressing the voltage tunable magnetron frequency, means for pulsing said modulated means to add pulse information to the output signal of said modulating means, a travelling wave tube amplifier, means for passing only the first lower sideband of the modulated signal to said amplifier, means for transmitting said amplified signal toward a target and for receiving the return signal from the target, a mixer circuit, means for applying the return signal to said mixer circuit, said last-named means including means for filtering out all frequencies in the image frequency band, means for applying the output of said voltage tunable magnetron to said mixer to thereby produce a first intermediate frequency of the same frequency as said low oscillator frequency, a second mixer, a local oscillator, means for applying said first intermediate frequency to said mixer, means for applying said local oscillator frequency to the mixer to thereby produce a second intermediate frequency, an automatic frequency control circuit connected between the output of said mixer and said local oscillator, a detector, means for applying the output of said second mixer to said detector, a display device, and means for applying the output of said detector to said display device.

3. An anti-jamming radar system, comprising; a travelling wave tube modulator, a voltage tunable magnetron, means for controlling the output frequency of said magnetron, means for applying the output of said magnetron to said travelling wave tube modulator, an oscillator, means for applying the output of said oscillator to said travelling wave tube to modulate the voltage tunable magnetron output frequency within said travelling wave tube modulator, means for pulsing said modulated means to add pulse information to the output signal of said modulator, a travelling wave tube amplifier, means for passing only the first lower sideband of said modulated signal to said travelling wave tube amplifier, means for transmitting said amplified signal toward a target and for receiving the return echo signal from the target, means for applying said return signal to a first mixer circuit, said last-named means including a means for filtering out all frequencies in the image frequency band, means for applying the output of said voltage tunable magnetron to said first mixer, a second mixer, means for applying the output of said first mixer to said second mixer, a local oscillator, means for applying the output of said local oscillator to said second mixer to thereby produce a second intermediate frequency, an automatic frequency control circuit connected between the output of said second mixer and said local oscillator, a detector, means for applying the output of said second mixer to said detector, a display device, means for applying the output of said detector to said display device.

\* \* \* \* \*